United States Patent

[11] 3,625,632

[72] Inventor Lesley C. Casterline
    Hurst, Tex.
[21] Appl. No. 865,734
[22] Filed Oct. 13, 1969
[45] Patented Dec. 7, 1971
[73] Assignee Bell Aerospace Corporation

[54] DUAL SERVO HYDRAULIC ACTUATOR CYLINDER FOR PITCH CONTROL
    12 Claims, 4 Drawing Figs.
[52] U.S. Cl. .................................................. 416/98,
    91/173, 92/119, 416/114
[51] Int. Cl. ....................................................... B64c 27/74,
    F01b 7/20, F01b 15/04
[50] Field of Search ............................................ 416/159,
    98, 162; 91/173, 217, 176; 92/118, 119, 161

[56] References Cited
UNITED STATES PATENTS

| | | | |
|---|---|---|---|
| 2,550,538 | 4/1951 | Doman ........................ | 416/159 |
| 2,628,683 | 2/1953 | Reuther ....................... | 416/162 |
| 3,152,522 | 10/1964 | Burden et al. ................ | 92/119 |
| 3,202,062 | 8/1965 | Burden ........................ | 92/119 |
| 3,448,810 | 6/1969 | Vogt ............................ | 416/162 |

*Primary Examiner*—Martin P. Schwadron
*Assistant Examiner*—Clemens Schimikowsk
*Attorney*—Richards, Harris & Hubbard

ABSTRACT: This invention relates to the mounting of a servo hydraulic actuator for cyclic or collective pitch control of the rotor blades on a helicopter. The actuator is constructed with a cylinder barrel mounted on the frame of the helicopter with a coupling having bearing surfaces shaped to correspond to a portion of a sphere having its center substantially displaced from the coupling toward the pitch horn.

INVENTOR:
LESLEY C. CASTERLINE

Richards, Harris & Hubbard
ATTORNEY

PATENTED DEC 7 1971

INVENTOR:
LESLEY C. CASTERLINE

Richards, Harris & Hubbard
ATTORNEY

DUAL SERVO HYDRAULIC ACTUATOR CYLINDER FOR PITCH CONTROL

BACKGROUND OF THE INVENTION

This invention relates to a servo hydraulic actuator for cyclic or collective pitch control of the rotor blades on a helicoptor and more particularly to a support therefor which is shaped to correspond to a portion of a sphere with a large radius of curvature and which, without imposing unwanted bending stresses on the actuator, accommodates structural displacement of the helicopter frame produced by differences in aircraft loading, variations within tolerances in the initial aircraft construction, and pylon rocking forces on the actuator caused by dynamic loads.

This invention has particular use in connection with the cyclic or collective pitch control of rotor blades on fairly large helicopters. In small aircraft direct mechanical coupling between the control stick and the pitch horn on the swashplate has been found to be adequate. In larger aircraft, however, the forces required for control are such that they cannot readily be provided by direct mechanical coupling. Consequently, powered boosters or actuators are generally provided.

An actuator system involves generally a hydraulically powered piston and barrel assembly which produces rectilinear movements which may be used for control operations. When such powered actuators are utilized, structural variations within permitted tolerances in the initial construction of the airframe between the positions of the upper and lower mountings for the actuators and variations produced by loading the aircraft, have been found to develop unwanted bending forces on the actuator system. Dynamic forces created by the rotor system are transmitted throughout the actuator system tending to cause the system to fail or work free from its fixed mounting.

SUMMARY OF THE INVENTION

The present invention provides a mounting system for a cylinder assembly that eliminates or substantially reduces the unwanted forces heretofore encountered in such systems thereby minimizing problems of fatigue. Particularly in connection with dual cylinder actuators, the invention serves to control the forces on the actuator so as to minimize undesired flailing motions heretofore encountered.

The present invention provides a servo actuator for introducing cyclic or collective pitch control by way of a swashplate to helicopter rotor blades. The assembly involves a first connector on the frame of a helicopter with a piston attached to the first connector. A barrel cooperates with the piston to introduce relative movement therebetween upon hydraulic actuation thereof. Valve means and flow channels are provided for the selective introduction of hydraulic fluid into the barrel to control the relative movement. A second connector is provided to connect the barrel to the frame of the helicopter. The second connector is located below the first connector for mounting the barrel. The bearing surfaces of the second connector are shaped to correspond to a portion of the surface of a sphere having a center of curvature above the second connector and approximately at the mid point of the stroke of the piston. The second connector is constructed to accommodate structural displacement due to aircraft loading as well as variations in relative positions between the first connector and the second connector without production of bending forces on the actuator assembly.

In a preferred embodiment, a dual servo hydraulic actuator is employed having tandem barrels and pistons. A lower piston is secured in the lower region of the aircraft frame. The upper barrel is secured in the region of the upper portion of the aircraft frame. An upper piston working in the upper barrel is connected to the lower barrel to provide a compound or dual hydraulic barrel. This system is provided with a fixed mount at the lower end of the first piston and a second mount supporting the upper barrel.

BRIEF DESCRIPTION OF THE DRAWINGS

For a more complete description of the present invention and for further objectives and advantages thereof reference will now be made to the accompanying drawings in which.

DESCRIPTION OF THE PREFERRED EMBODIMENT

Figure 1

Figure 1:
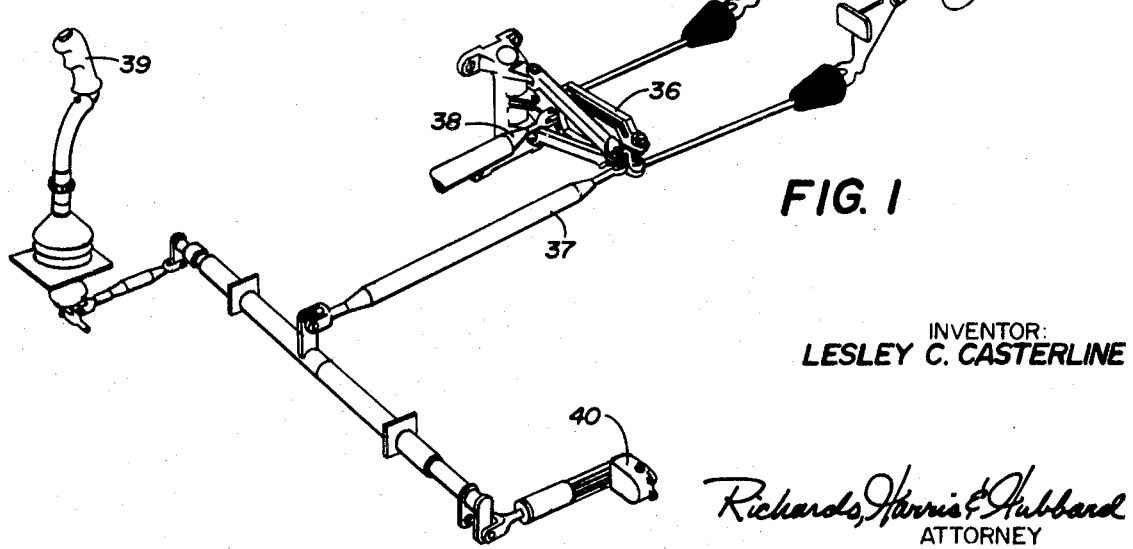
FIG. 1 diagrammatically illustrates the setting for the present invention showing two dual hydraulic actuators provided for cyclic pitch control.

FIG. 1 illustrates a cyclic control system for controlling the positions of the horns on the swashplate of a helicopter. The swashplate horns are shown only fragmentarily as the members 10a and 11a which extend radially outward at angularly spaced points from a swashplate of conventional character. A first dual servo hydraulic actuator 10 includes a control tube which 12 extends from horn 10a through a universal joint 13 to the upper end of a piston 14. Piston 14 works in a barrel 15 which in turn is mounted on a frame member 16. Member 16 is secured to the upper portion of the frame of the aircraft.

The piston 14 extends through barrel 15 and is connected by way of control valve linkage structure 17 to a lower barrel 18 which has a control valve 19 and which cooperates with a piston 21 (not shown in FIG. 1) which is anchored to the airframe by way of a universal type coupling generally known as a uniball coupling 20. The coupling 20 is anchored in the lower portion of the aircraft frame and normally is vertically below the mounting 16.

A servo valve input tube 30 is connected at its upper end to a pivot 31 on one end of an input control lever 32. The control lever serves to control valves 17 and 19 for the selective introduction of hydraulic fluid into the upper barrel 15 and into the lower barrel 18. The control tube 30 is actuated by way of bellcrank 35 which is connected by way of the conventional mixing lever assembly 36 and control tubes 37 and 38 to the control stick 39 and to a magnetic braking system such as the brake 40. Such controls in general are well known and will not be described in detail herein.

A second dual servo hydraulic actuator 11 is similar to actuator 10 described above and is operated by way of the mixing lever assembly 36. The actuator 11 is mounted at a point on the frame support member 41 and is anchored at the lower end by way of a uniball connection 42 to a lower portion of the frame of the aircraft. A third dual hydraulic actuator (not shown) used for cyclic control of the pitch of the rotor blades is mounted at location 43 in unit 41 and is provided with suitable input and output connections for collective control of the pitch of the rotor blades. The third actuator may have the same construction as actuators 10 and 11; therefore, it is not shown on this diagram.

In the present invention, the coupling structure in mounting 16 is of unique character. Its structure primarily serves to prevent and inhibit the development of bending forces on the actuator. The invention has utility both in single cylinder actuators and dual cylinder actuators. It has particular merit in connection with dual cylinder actuators as will be explained. For that reason it is described in connection with the dual cylinder unit.

Figure 2

Figure 2:
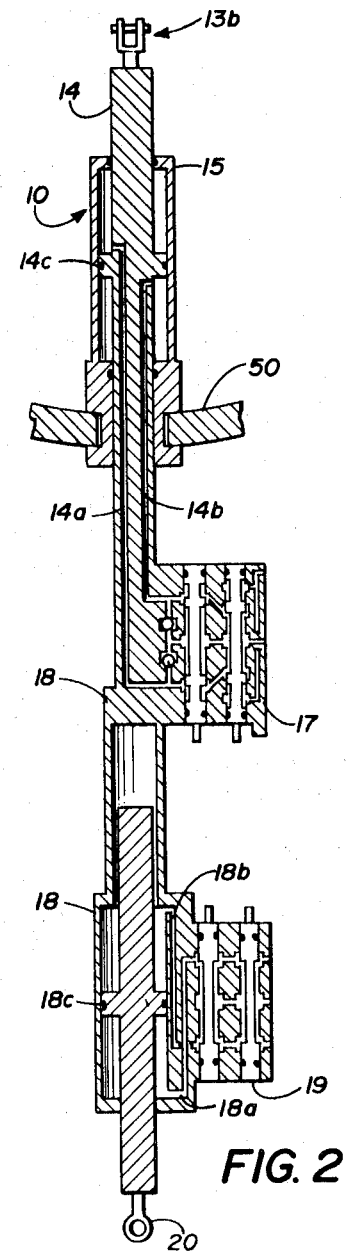
FIG. 2 is a schematic diagram of one actuator and the mounting forming the present invention.

Actuator 10 is shown schematically in FIG. 2. The actuator is composed of an upper piston 14 to the top of which is attached a clevis 13b of a universal joint (not shown) with piston 14 being mounted in an upper barrel 15 with the barrel 15 being mounted on a support plate 50 which is secured to the aircraft frame and is shaped to correspond with a portion of the surface of a sphere having its center substantially above the support plate 50 and approximately at the midpoint of the stroke of the clevis 13b of the universal joint attached to the upper end of the piston 14.

The mounting for the surface plate 50 has a center bore which is larger than the outer diameter of the barrel 15 so that adjustments can be made in the initial installation of the actuator to compensate for tolerances in the location and orientation of the mounting structure for support plate 50 and the location of the uniball connection 20 and to accommodate structural displacement due to aircraft loading. The mounting structure working with plate 50 and the uniball connection 20 are located in such a way that installation can be made without initially imposed unwanted bending stresses on the actuator.

As indicated, the piston 14 extends through the barrel 15 and downwards so that it is coupled to the upper end of the lower barrel 18. In one operating position control valve 17 supplies hydraulic fluid by way of passage 14a to apply hydraulic pressure in the region in barrel 15 above an O-ring seal 14c and in a second operating position valve 17 supplies hydraulic fluid by way of passage 14b to apply pressure in the region in barrel 15 below O-ring 14c.

In a similar manner the control valve 19 is provided to control the introduction of hydraulic fluid by way of channel 18a to the barrel 18 below an O-ring seal 18c and by way of channel 18b to barrel 18 above O-ring seal 18c.

Valves 17 and 19 cooperate so that when it is desired to elongate the control system to apply an upward force to control horns on the swashplate, oil is introduced into the region above seal 18c in barrel 18 and into the region below seal 14c in barrel 15. A downward force is applied to the horns of the swashplate by injecting oil into the region below seal 18c in barrel 18 and into the region above seal 14c in barrel 15.

The mounting structure working with bearing plate 50 has been shown schematically in FIG. 2. A preferred form will be described in detail in connection with FIG. 4.

Figure 3

Figure 3:
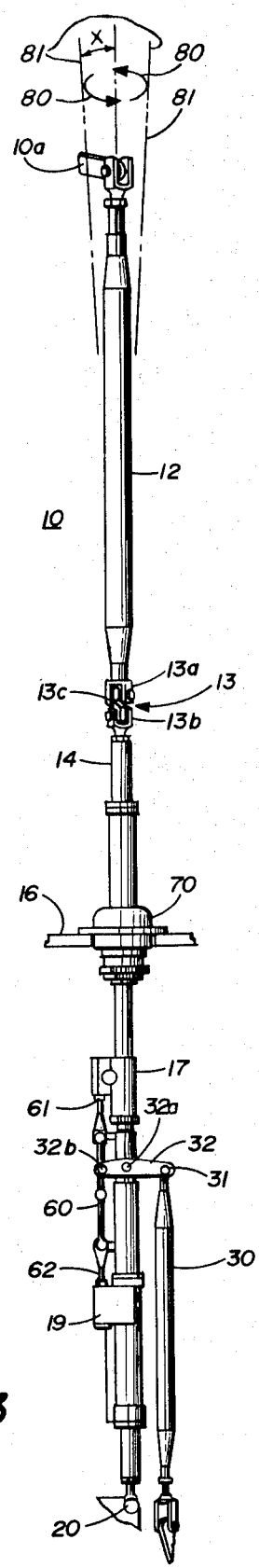
FIG. 3 is a an elevational view of one of the actuators.

As shown in FIG. 3, swashplate horn 10a is coupled to control tube 12 which in turn is connected to the upper end of piston 14 by way of a universal joint 13 which involves two clevises 13a and 13b and an intermediate member 13c. The mounting unit 16 is connected to the actuator system by way of a housing structure 70. Coupling 20 anchors the lower end to the frame.

The construction is such that rocking of the rotor pylon is absorbed and is prevented from inducing bending to the actuator which is particularly important in the dual barrel unit when bending forces on the barrel below said second connector are of particular concern. More particularly, as the upper coupling to horn 10a moves through angle x, the tendency is to bend piston 14. However, by reason of a large spherical bearing surface in the coupling 70, the forces are accommodated without bending effects below the mounting 16. It will be appreciated that the displacements x may be dynamic, as caused by pylon rock, or may be fixed due to initial displacement of the mounts for the actuator provided in initial construction of the airframe, or such displacement may be due to structural shifting as the airframe is loaded with passengers and/or cargo.

Further, as was shown in FIG. 1, movements of the pilot's cyclic control stick through a mechanical linkage system cause the control tube 30 to move and operate the control lever 32. Control lever 32 is pivoted at point 32a and is coupled by way of a pivotal connection 32b to a control valve linkage 60. The control valve linkage 60 extends upward to the input control rod 61 of the valve 17 and downward to the input control rod 62 of the valve 19.

Figure 4

Figure 4:
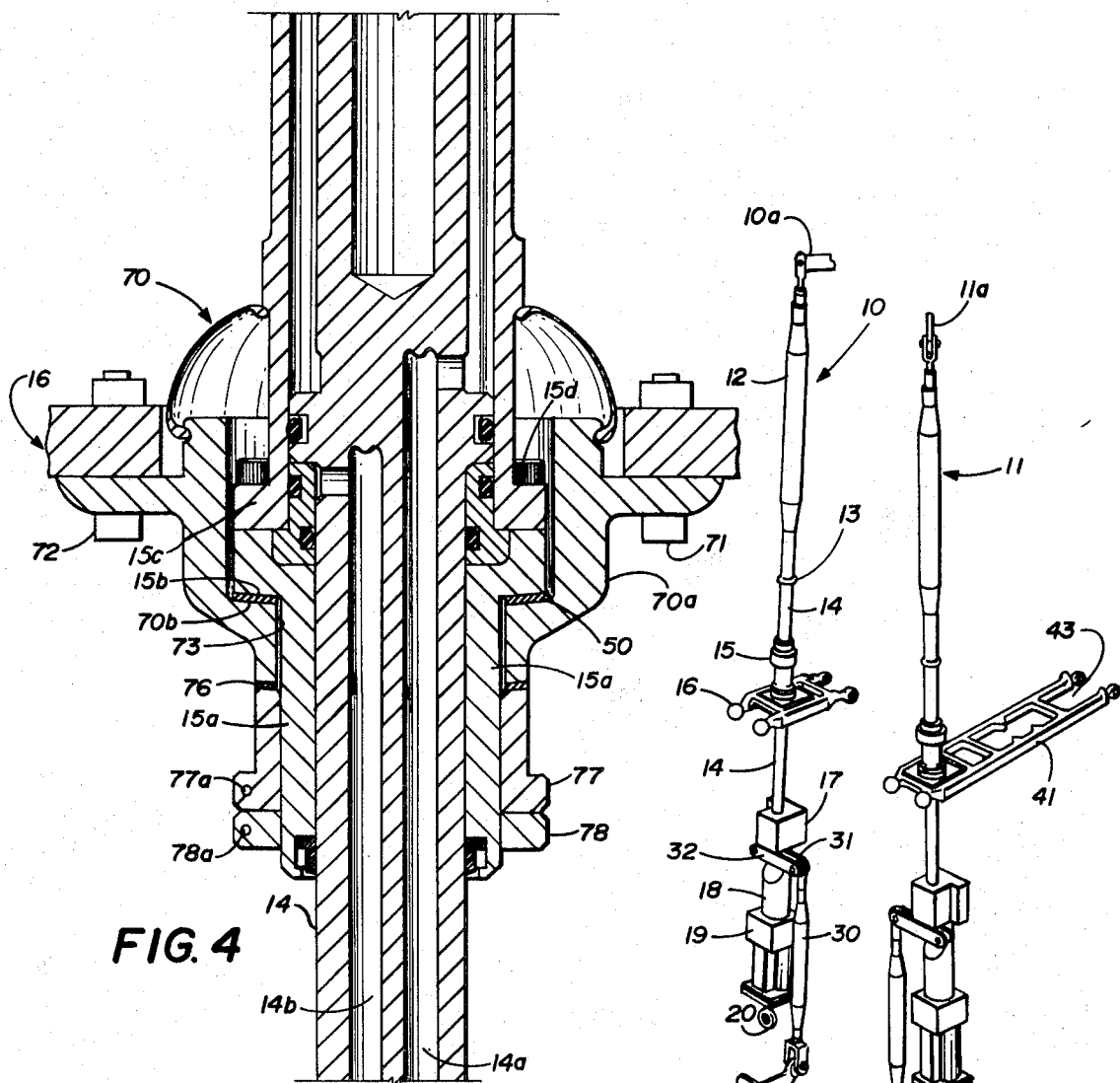
FIG. 4 illustrates, in section, one embodiment of the spherical mounting of the invention.

The housing structure 70 of FIG. 3 is shown in the detailed sectional drawing of FIG. 4. As shown in FIG. 4, a supporting cup 70a is secured to the mounting unit 16 by bolts 71 and 72. The cup is upwardly facing and has a bottom cylindrical opening 73 which is larger than the diameter of the lower portion 15a of the upper barrel 15. The barrel 15 has a downwardly facing bearing surface 15b which is shaped to correspond to a portion of the surface of a sphere. A wear plate or support plate 50 is provided between the upper surface 70b of the cup 70a and the lower surface 15b which is shaped to correspond to a portion of the surface of a sphere. A wear plate or support plate 50 is provided between the upper surface 70b of the cup 70a and the lower surface 15b of the barrel 15. A second wear plate 76 is provided adjacent to the downward facing lower end of the cup 702. A bearing nut 77 is secured onto the lower portion 15a of upper barrel 15. Finally a locknut 78 is secured to the lower portion 15a of upper barrel 15 and is fixed in place by a lock wire threaded through holes 77a and 782.

The lower end 15a of the barrel 15 is formed from a separate element and is secured to the upper portion 15c of barrel 15 by means of bolts 15d. Piston 14 extends below the bottom of the barrel 15.

In accordance with the present invention, the wear plates 50 and 76 as shown in FIG. 4 and the confronting surfaces contacting the same are shaped correspond to the surface of concentric spheres. The center of curvature of the sphere is located approximately at the mid point of the stroke of the clevis 13b of the universal joint 13 (FIG. 3) which is attached to the upper end of piston 14. This curved coupling structure inhibits the application of bending forces to the actuator. This is particularly important with reference to stresses on the portion of the actuator between the upper mounting 16, FIG. 1, and the lower uniball mounting 20 caused by dynamic forces applied to the actuator above mounting 16 in directions which are not parallel to the axis of piston 14. Nonaxial forces (along or beyond the perimeter of the cone defined by arrows 80 and dot-dash lines 81, FIG. 3) may be applied to the upper end of the piston 14 by rod 12 through clevis 13b. When the forces are applied at right angles relative to the axis of the cylinder assembly in an amount less than the angular deviation from a line from the center of clevis 13b to the perimeter of the wear plates 50 and 76, as shown in FIG. 2, there will always be a supporting surface normal to and opposing the force. In such cases, forces which heretofore tended to bend the actuator and produce unwanted stresses on it can never be applied to the portion of the hydraulic actuator located below mounting 16. With the coupling surfaces 50 and 76 shaped to correspond to the surface of a portion of a sphere, these forces can be transferred to the aircraft frame through the coupling device without introducing bending forces to the actuator assembly.

Having described the invention in connection with certain specific embodiments thereof, it is to be understood that further modifications may now suggest themselves to those skilled in the art and it is intended to cover such modifications as fall within the scope of the appended claims.

In the claims:

1. In a helicopter of the type including a frame, rotor blades, and a swashplate connected to the rotor blades, a dual servo hydraulic actuator mounted to introduce cylic or collective pitch by way of the swashplate to the rotor blades of the helicopter which comprises:
   a. a first connector on the frame of said helicopter,
   b. a first piston connected to said first connector,
   a first barrel cooperating with said first piston to produce motion of said barrel relative to the piston upon the introduction of hydraulic fluid into said barrel,
   d. a second barrel mounted coaxially above said first barrel,
   e. a second piston cooperating with said second barrel for relative movement therebetween upon the introduction of hydraulic fluid into said second barrel, said second piston being connected at the upper end thereof to the swashplate and said second piston extending through said second barrel and coupled to said first barrel, and f. a second connector on the frame of said helicopter located above said first connector for mounting said second barrel, said second connector having a support surface shaped to correspond to a portion of a sphere the center of which is located in the region of the midpoint of the stroke of the top of the second piston.

2. The combination set forth in claim 1 wherein:

said second connector has a center bore through which said second barrel passes of diameter greater than the diameter of the second barrel for accommodation of structural displacement due to loading and to variations within permitted tolerances of the locations of the first and second connectors and for inhibition of vibrations without applying bending forces to the actuator below the said second connector, and further includes structure including valve means and flow channels for selectively introducing hydraulic fluid into said barrels for controlled movement of said first barrel and said second piston relative to said first piston and said second barrel respectively.

3. The combination set forth in claim 1 in which a control rod connected to said swashplate is provided with a universal coupling to the upper end of said second piston.

4. The combination as set forth in claim 1 in which two independent valves control flow of hydraulic fluid to said barrels in response to pilot input.

5. The combination set forth in claim 4 in which said valves are mounted in fixed relation to said first barrel and in which flow channels extend from above and below a piston seal in said first barrel and in which additional flow channels extend from the upper valve through said second piston to portions above and below a piston seal in said second barrel and common actuator means are provided for both valves.

6. The combination set forth in claim 1 in which valving means responsive to pilot control simultaneously adjusts the flow of said fluid to one of a pair of sets of chambers in which the first set comprises the chamber between the second piston and the second barrel below a piston seal and a chamber between the first piston and the first barrel above a piston seal in which the second set comprises the chamber between the second piston and the second barrel above the piston seal and the chamber between the first piston and the first barrel below the piston seal.

7. In a control system of the type in which a hydraulic actuator is connected between a helicopter frame and a swashplate and is employed to control the pitch of rotor blades, the improvement comprising:

a first piston connected to the helicopter frame;

a barrel for the first piston;

a second piston connected to the first barrel and to the swashplate;

a barrel for the second piston; and a support structure for the second barrel which comprises mating, concentric spherical bearing surfaces on the helicopter frame and the second barrel the center of which is located above the surfaces in the region of the midpoint of the stroke of the top of the second piston.

8. The combination set forth in claim 14 wherein said support structure includes a cup mounted on said frame with a central bore through the bottom thereof and with an internal upfacing support ring and wherein said second barrel has a downfacing ring with the confronting surfaces of said rings being complementary and of configuration to a slice from said sphere.

9. The combination set forth in claim 8 in which a first bearing insert of shape corresponding with a slice from said sphere is positioned in said cup between said rings.

10. The combination set forth in claim 9 wherein a second spherical bearing insert is secured for contacting the bottom of said cup with locking means secured to said second barrel below said cup.

11. A servo hydraulic actuator mounted to introduce cyclic or collective pitch by way of a swashplate to the rotor blades of a helicopter which comprises:

a. a first hydraulic cylinder barrel, b. a first piston cooperating with said first barrel for relative movement therebetween upon the introduction of hydraulic fluid into said first barrel, said support piston being connected at the upper end thereof to the swashplate, c. a connector on the frame of said helicopter and located below said swashplate for support of said first barrel, said connector having a support surface shaped to correspond to a portion of a sphere whose center is located in the region of the midpoint of the stroke of the top of said first piston, d. a second hydraulic cylinder barrel connected to said first hydraulic piston, and e. a second piston cooperating with said first barrel for relative movement therebetween upon the introduction of hydraulic fluid into said second barrel, said second piston being connected at the lower end thereof the the frame of said helicopter.

12. The combination set forth in claim 11 wherein said connector includes a cup mounted on said frame with an internal upfacing support surface and wherein said first barrel has a downfacing bearing surface with said surfaces being complementary and of configuration corresponding to a portion of the surface of said sphere.

* * * * *

PO-1050
(5/69)

UNITED STATES PATENT OFFICE
CERTIFICATE OF CORRECTION

Patent No. 3,625,632     Dated  Dec. 7, 1971

Inventor(s)  Lesley C. Casterline

It is certified that error appears in the above-identified patent and that said Letters Patent are hereby corrected as shown below:

Col 2, line 11, cancel "a";
      line 25, "which 12" should be --12 which--.
Col 3, line 16, "imposed" should be --imposing--.
Col 4, lines 12-15, "which is shaped...surface 15b" is repeated material;
      line 17, "702" should be --70a--;
      line 20, "782" should be --78a--;
      line 27, after "shaped" insert --to--;
      line 43, "from" should be --of--;
      line 69, at the beginning of line insert --c.--.
Col 6, line 10, "claim 14" should read -- claim 7 --.
      line 44, "the the" should be --to the--.

Signed and sealed this 8th day of August 1972.

(SEAL)
Attest:

EDWARD M. FLETCHER, JR.     ROBERT GOTTSCHALK
Attesting Officer            Commissioner of Patents